United States Patent
Woodall

(10) Patent No.: US 6,735,579 B1
(45) Date of Patent: May 11, 2004

(54) STATIC MEMORY PROCESSOR

(75) Inventor: Roger L. Woodall, Jewett City, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/477,638

(22) Filed: Jan. 5, 2000

(51) Int. Cl.⁷ ................................................. G06E 1/00
(52) U.S. Cl. ...................................................... 706/20
(58) Field of Search .............................. 706/20, 21, 15

(56) References Cited

U.S. PATENT DOCUMENTS 5,621,863 A * 4/1997 Boulet et al. ................. 706/26

* cited by examiner

Primary Examiner—Emanuel Todd Voeltz
Assistant Examiner—Joe Hirl
(74) Attorney, Agent, or Firm—James M. Kasischke; Michael F. Oglo; Jean-Paul A. Nasser

(57) ABSTRACT

A static memory processor for pattern recognition and an input data dimensionality reduction is provided having a multi-layer harmonic neural network and a classifier network. The multi-layer harmonic neural network receives a fused feature vector of the pattern to be recognized from a neural sensor and generates output vectors which aid in discrimination between similar patterns. The fused feature vector and each output vector are separately provided to corresponding positional king of the mountain (PKOM) circuits within the classifier network. Each PKOM circuit generates a positional output vector with only the element corresponding to the element of the fused feature vector or output vector having the highest contribution in its respective vector having a value corresponding to one. The positional output vectors are active in a multidimensional memory space and are read by a recognition vector array which generates class likelihood outputs determined by the occupied memory space. The class likelihood outputs are provided to a class PKOM circuit which outputs classification identifiers to provide the desired pattern recognition.

22 Claims, 9 Drawing Sheets

STATIC MEMORY PROCESSOR

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This patent application is co-pending with related patent applications entitled Neural Directors 09/436,957 Neural Sensors 09/477,653 and Dynamic Memory Processor 09/477,653, by the same inventor as this patent application.

BACKGROUND OF THE INVENTION (1) Field of the Invention

The present invention relates generally to the field of electronic neural networks, and more particularly to a new architecture for neural networks having a plurality of hidden layers, or multi-layer neural networks, and further to new methodologies for providing supervised and unsupervised training of neural networks constructed according to the new architecture.

(2) Description of the Prior Art

Electronic neural networks have been developed to rapidly identify patterns in certain types of input data, or to accurately classify the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, or neurons, each of which is associated with one of the alphanumeric characters which the neural network can identify. The input signals from the input terminals are coupled to the processing nodes through certain weighting functions, and each processing node generates an output signal which represents a value that is a nonlinear function of the pattern of weighted input signals applied thereto. Based on the values of the weighted pattern of input signals from the input terminals, if the input signals represent a character which can be identified by the neural network, one of the processing nodes which is associated with that character will generate a positive output signal, and the others will not. On the other hand, if the input signals do not represent a character which can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes, or elements. As an example, the weighting functions in the above-described character recognition neural network essentially will represent the pixel patterns which define each particular character. Typically, each processing node will perform a summation operation in connection with the weight values, also referred to as connection values or weighting values, representing the weighted input signals provided thereto, to generate a sum that represents the likelihood that the character to be identified is the character associated with that processing node. The processing node then applies the nonlinear function to that sum to generate a positive output signal if the sum is, for example, above a predetermined threshold value. The nonlinear functions which the processing nodes may use in connection with the sum of weighted input signals are generally conventional functions, such as step functions, threshold functions, or sigmoids. In all cases the output signal from the processing node will approach the same positive output signal asymptotically.

Before a neural network can be useful, the weighting functions for a set of the respective input signals must be established. In special cases, the weighting functions can be established a priori. Normally, however, a neural network goes through a training phase, in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. Once trained, a neural network can generally accurately recognize patterns during an operational phase. The degree of success is based in part on the number of training patterns applied to the neural network during the training stage and the degree of dissimilarity between patterns to be identified. Such a neural network can also typically identify patterns which are similar to the training patterns.

One of the problems with conventional neural network architectures as described above is that the training methodology, generally known as the "back-propagation" method, is often extremely slow in a number of important applications. Also, under the back-propagation method, the neural network may provide erroneous results which may require restarting the training. In addition, even after a neural network has been through a training phase, confidence that the best training has been accomplished may sometimes be poor. If a new classification is to be added to a trained neural network, the complete neural network must be retrained. Further, the weighting functions generated during the training phase often cannot be interpreted in ways that readily provide understanding of what they particularly represent.

SUMMARY OF THE INVENTION

Accordingly, it is an object of the present invention to provide a new and improved neural network architecture for use in pattern recognition in which weighting functions may be determined a priori.

Another object is to provide a neural network architecture which can be trained with a single application of an input data set.

Other objects and advantages of the present invention will become more obvious hereinafter in the specification and drawings.

In accordance with the present invention, a new neural network architecture, referred to hereinafter as a static memory processor, is provided. The static memory processor receives inputs from a sensor and provides low dimensional pattern recognition or classification identifiers for the inputs. The static memory processor provides pattern recognition for static inputs, i.e., inputs which do not vary over the time necessary for recognition. The static memory processor is part of a new neural network technology that is constructed rather then trained. Since the words "neural networks" often connote a totally trainable neural network, a constructed neural network is a connectionist neural network device that is assembled using common neural network components to perform a specific process. The constructed neural network assembly is analogous to the construction of an electronic assembly using resistors, transistors, integrated circuits and other simple electronic parts. A constructed neural network is fabricated using common neural network components such as processing elements (neurons), output functions, gain elements, neural network connections of certain types or of specific values and other artificial neural network parts. As in electronics, the design goal and the laws of nature such as mathematics, physics, chemistry, mechanics, and "rules of thumb" are used to govern the assembly and architecture of a constructed neural network. A constructed neural network, which is assembled for a specific process without the use of training, can be considered equivalent to a trained neural network having accomplished an output error of zero after an infinite training sequence. Although there are some existing connective circuits that meet the design criteria of a constructed neural network, the term "constructed neural network" is used herein to differentiate this new neural technology which does not require training from the common neural network technology requiring training. A constructed neural network can consist of a neural network module, such as a neural director, a neural sensor, or a vector decoupler, and may contain one or more modules to develop a specific neural architecture. The construction and functioning of some or all of these modules will be further explained hereinafter. Combinations of neural network modules in the present invention lead to a unique neural architecture producing a distributed connectionist computational process. It is noted that one embodiment of the present invention requires training of one neural network module with a single application of an input stimulus, but does not require retraining of previously learned input stimuli when being trained for a new input stimulus.

Constructed neural networks can be embodied in analog or digital technologies, or in software. Today one can find a blurring between the boundaries of analog and digital technologies. Some of the classic analog processing is now found in the realm of digital signal processing and classic digital processing is found in analog charged couple devices and sample and hold circuits especially in the area of discrete time signals and delay lines.

One of the differences between a classic neural network device and a constructed neural network device is in the internal processing of recognition information. The neural network processing of a multilayer constructed neural network device, or of a subsection of a constructed neural network device, lies within a multiplicity of concentric multidimensional spherical spaces. This can simply be envisioned as an "onion" where each spherical onion layer represents a spherical multidimensional layer populated with neural network processors. A multilayer constructed neural network device processes an input vector, which may be modified as it propagates through each layer by an alteration of the vector's direction in its multidimensional space. The vector's direction in its multidimensional space is used in the recognition of the vector's representation. The vector's altered direction in its spherical multidimensional space compared to the vector's unaltered direction can be seen as a nonlinearity in a constructed neural network. The classic neural network device primarily uses nonlinear neurons for its nonlinear processing in an undefined subspace. In addition to the possible use of nonlinear neurons for its nonlinear processing, the constructed neural network device in a multidimensional spherical subspace primarily uses a second form of nonlinearity as will be discussed further below.

One of the components utilized in constructing a static memory processor is a neural director. In brief, a neural director receives an input vector X comprising "I" input components $X_i$ and generates in response thereto, an output vector Y comprising "J" output components $Y_j$, where "I" and "J" are the neural director's input and output dimensions. The neural director has an input processing node layer comprised of "I" processing nodes and an output processing node layer comprised of "J" processing nodes. Each output processing node receives the outputs from the input processing nodes to which a "j" subset of weighting values w(i,j) has been applied and generates one of said output components $Y_j$ representing a linear function in connection therewith. The weighting values w(i,j) contain a unique internal representation of a uniform spatial distribution.

A neural director can be constructed to be one of two types, designated type 1 or type 2. The two types differ in what may be termed "spatial linearity". In addition to classic linearity, i.e., the use of nonlinear output functions in the neural circuit, spatial linearity includes a "linearity in space". In a fully populated single layer neural network which has "I" input processing nodes and "J" output processing nodes, each of the output processing nodes will contain "I" weight values. The "I" weight values of each processing node can be considered a vector of "I" components in an "I" dimensional space. One of the many important characteristics of a constructed neural network is that a classification of an input pattern is greatly defined by a vector's direction in a multidimensional space. Thus, spatial linearity/nonlinearity affects the internal process of a static memory processor. An angular relationship between input and output vector pairs can be used to define spatial linearity. A network is linear in space when the angles between all different vector pairs are the same in the output space as they are in the input space regardless of the dimensionalities of the spaces. A network is nonlinear if it is either classically and/or spatially nonlinear. A spatial nonlinearity causes an input vector pair to diverge in direction in the output space and is analogous to a system nonlinearity in chaos theory where two similar initial condition points diverge over time for each cycle through the nonlinear system. A neural director type 1 is linear in both its neural circuit, i.e., classically linear, and in its space, i.e., spatially linear. Generally, a neural director type 2 is classically linear but spatially nonlinear, though it will be understood that either classic or spatial nonlinearity will result in a neural director type 2. When compared to a neural director type 1 of the same input and output dimensions, a neural director type 2 nonlinearly shifts an input vector away from the output direction which one would anticipate using the neural director type 1. One embodiment of a neural director type 2 produces a nonlinear gradient between two poles in its multidimensional output space, one pole lying in the center of a sub space that is directed by all positive elements and the other pole being the opposite polarity.

Spatial nonlinearity is a parameter for a constructed neural network connectionist device which affects the recognition differentiation between similar input patterns. Reduced to its most basic concept, a constructed neural network senses features from a specific input pattern to provide a deterministic direction through a connecting circuit as a feature vector. This deterministic direction in a multidimensional space is the information that is used for the recognition and classification of the pattern. The spatial nonlinearities of the type 2 neural director provide a process that allows the discrimination of finer details in the recognition of an input pattern. Spatial nonlinearity is the result of a deterministic change in a vector's direction in its multidimensional space relative to its intended direction in a linear space. The dimensionalities between these spaces may be different or the same. While most conventional neural networks demonstrate a spatial nonlinearity, their spatial nonlinearity is primarily caused by the use of nonlinear neural neurons.

The neural director type 1 has several advantages in performing different operations depending upon its application in a network. A neural director type 1 has the ability to linearly transform a vector from one set of dimensions to the same or that of another set of dimensions. The type 1 neural director can fuse separate data paths into a single vector as each output element of the vector contains a composition of all input elements of the input data. The type 1 neural director may also distribute input data into different layers of like data and can expand its input data into higher dimensions, where the input data can be sensed at a higher resolution than it can in its lower dimension. Although the dimensions are not totally independent, the dimensional independency can be increased when the type 1 neural director is coupled with a spatially nonlinear device. The neural director type 1 can represent a generalized matched filter which contains all possible combinations of input patterns due to its distributed connection set. The type 1 neural director can linearly expand input data or can use nonlinear output functions, which when applied to a conventional neural network with the original data, or with the original data as the neural director input in lieu of the original data alone, will make the conventional network learn faster. Depending on the resolution chosen for the internal representation of the uniform spatial distribution, a neural director type 1 may be called a "near" ideal neural director type 1. A near ideal neural director type 1 remains linear in its neural circuit but it is slightly nonlinear in space because the position of a vector in the neural director's output space will be altered relative to the vector's ideal position in a linear space. Used in a multi-layer neural director, the near ideal neural director type 1, without other nonlinearities, increases the recognition resolution of similar patterns.

The static memory processor utilizes combinations of neural directors to form a multi-layer harmonic neural network and a classifier network. The pattern to be recognized is input into or sensed by a neural sensor which generates a fused feature vector. The multi-layer harmonic neural network receives the fused feature vector and generates output vectors which aid in discrimination between similar patterns. The fused feature vector and each output vector are separately provided to corresponding positional king of the mountain (PKOM) circuits within the classifier network. Each PKOM circuit generates a positional output vector with only one of its elements having a value corresponding to an active output of one, this element corresponding to the element of the fused feature vector, or output vector, having the highest contribution in its respective vector. All other elements of the positional output vector have a value corresponding to zero (no output). The positional output vectors are activations in a multidimensional memory space, thus the memory space is sparsely populated with active outputs corresponding to the highest contributing elements. A set of active outputs is called a memory vector. A recognition vector array reads the memory vector and generates class likelihood outputs as determined by the occupied memory space. The class likelihood outputs are provided to a class PKOM circuit which outputs classification identifiers. For each potential class, or set of features of the input pattern, the class PKOM provides output values corresponding to the respective likelihood of the features, with the class whose likelihood is the highest having the maximum asserted output value. Thus the classification identifiers provide the recognition of the input pattern desired.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
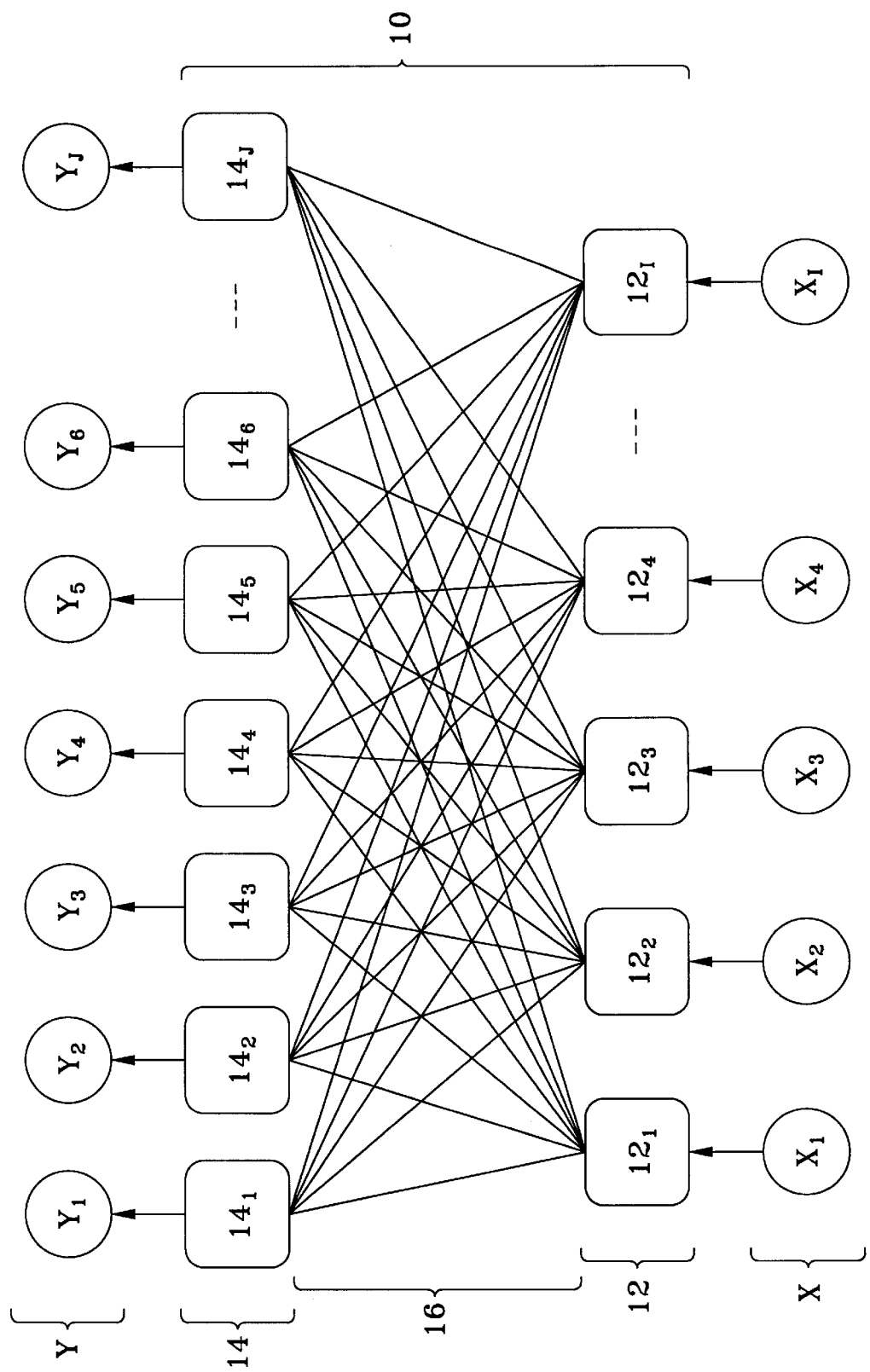
FIG. 1 is a general or neural schematic illustrating a fully populated neural director.

Referring now to FIG. 1, there is shown a general neural schematic illustrating a neural director 10 constructed in accordance with the invention. Neural director 10 includes an input processing node layer 12, an output processing node layer 14 and a set of connections, or weighting set w(i,j), shown as 16 in FIG. 1. An input vector X includes a plurality of input signals $X_1$ through $X_I$, comprising components $X_i$ of the input vector X. Input processing node layer 12 has a corresponding plurality of input processing nodes $12_1$, through $12_I$, each input processing node $12_i$ receiving corresponding input signal $X_i$.

Each node $12_i$ of the input processing node layer 12 generates a processed signal which it couples to each one of a plurality of output processing nodes $14_1$ through $14_J$, as indicated by weighting set 16. The number "I" of input processing nodes $12_i$ and the number "J" of output processing nodes $14_j$ are the input and output dimensions of the neural director 10. In general, the value of "J" is equal to or greater than the value of "I". The processed signals generated by each input processing node $12_i$ represent a value reflecting a predetermined linear function of the input signal $X_i$. All of the input processing nodes $12_i$ preferably use the same linear function, but apply different weighting values to the function in accordance with the weighting set w(i,j) 16.

Each output processing node $14_j$ of the output processing node layer 14 also generates an output signal $Y_j$, comprising the output vector elements $Y_1$ through $Y_J$ of output vector Y. Each output processing node $14_j$ effectively receives the weighted values of processed signals from the input processing nodes $12_i$ connected thereto according to the weighting set w(i,j) 16, generates a sum of the weighted values and generates in response to the sum an output signal $Y_j$ representing a value reflecting a function of the generated sum. All of the output processing nodes $14_j$ use the same function, but the function used by the output processing nodes $14_j$ may differ from the linear function used by the input processing nodes $12_i$.

As described above, the neural director 10 is constructed, rather than trained as in a conventional neural network. Accordingly, the weighting set w(i,j) 16 is determined a priori, and not in relation to any training data. As noted above, the input signals received into processing node layer 12 may be viewed as a vector X, having components $X_i$, which is a vector of "I" dimensions. Similarly, the outputs provided by the output processing node layer 14 may be viewed as a vector Y having components $Y_j$, which is a vector of "J" dimensions where "J" is equal to or greater than "I". Each of the output processing nodes $14_j$ contains an "I" dimensional vector of weighted values, thus all the weighted values in the neural director 10 can be represented by a "J" array of "I" dimensional vectors, or the weighting set w(i,j) 16.

An "I" dimensional vector of weight values for a typical input processing node $12_i$ is in a normalized form of a unit vector. Each of the represented unit vectors has a specific relationship relative to its nearest neighboring unit vectors: the cosine of the angle between any two adjacent or nearest neighbor vectors is a constant. These nearest neighbor vector requirements will produce a neural director 10 with a weighting set w(i,j) 16 that has the same values as a set of "J" unit vectors of "I" dimensions which are uniformly distributed throughout an "I" dimensional unit sphere. Each input processing node $12_i$ is associated with a common dimension "i" of the weighting set w(i,j) 16.

The neural director 10 weight values of the weighting set w(i,j) 16 contain a unique internal representation for a relative spatial distribution. The weighting set w(i,j) 16 for neural director 10 with an "I" input dimension and a "J" output dimension is given as:

$$w(i,j)=ka(i,j)|S^*, \quad (1)$$

where a(i,j) is a "J" dimensional array of unit vectors of "I" dimensions;

k is a constant which represents a non unit vector magnitude of a weighting set w(i,j) 16 as compared to the vector set a(i,j); and

|S* is defined as a symbol to represent the uniform distribution of the "J" unit vectors throughout a unit sphere of "I" dimensions.

Thus the cosine value between any two adjacent unit vectors is a constant everywhere in the unit sphere. The cosine test is a metric to measure the uniformity of the distribution. For a typical k value of one, w(i,j)=a(i,j). Thus the weight values to an output processing node "j" are the same numerical values as the "i" elements of the appropriate "j" unit vector.

A neural director that contains equal input and output dimensions has an additional requirement in its construction, the additional requirement being a coordinate axis shift between the input space and the output space. The coordinate axis shift is defined by the following description. The position of the first output coordinate axis is at a 45 degree angle relative to any and each pair of input coordinate axes. The remaining output coordinate axes are all orthogonal to said first output coordinate axis.

A general outline for the design of an "I" input dimension and a "J" output dimension neural director 10 is to fully pack a unit sphere with unit vectors of "I" dimensions. A packing cosine is chosen to produce an optimum high packing density with a minimum size of the array of vectors packed. When the sphere is judged "fully packed" the array of vectors is saved to allow an at least one iteration of vector selection. An input of a culling cosine parameter is used to estimate the correct final density of the "J" vectors in the unit sphere. A unit vector from the packed array is chosen and all unit vectors lying within the culling cosine value of the chosen unit vector are culled, or deleted from the packed array. The nearest remaining unit vector is chosen, culling about that vector is performed and the process is repeated until no remaining vector lies within the culling cosine value of any other remaining vector. Values for the culling cosine can be iteratively chosen until the remaining vectors produce the uniform distribution required by the design of the neural director.

Figure 2:
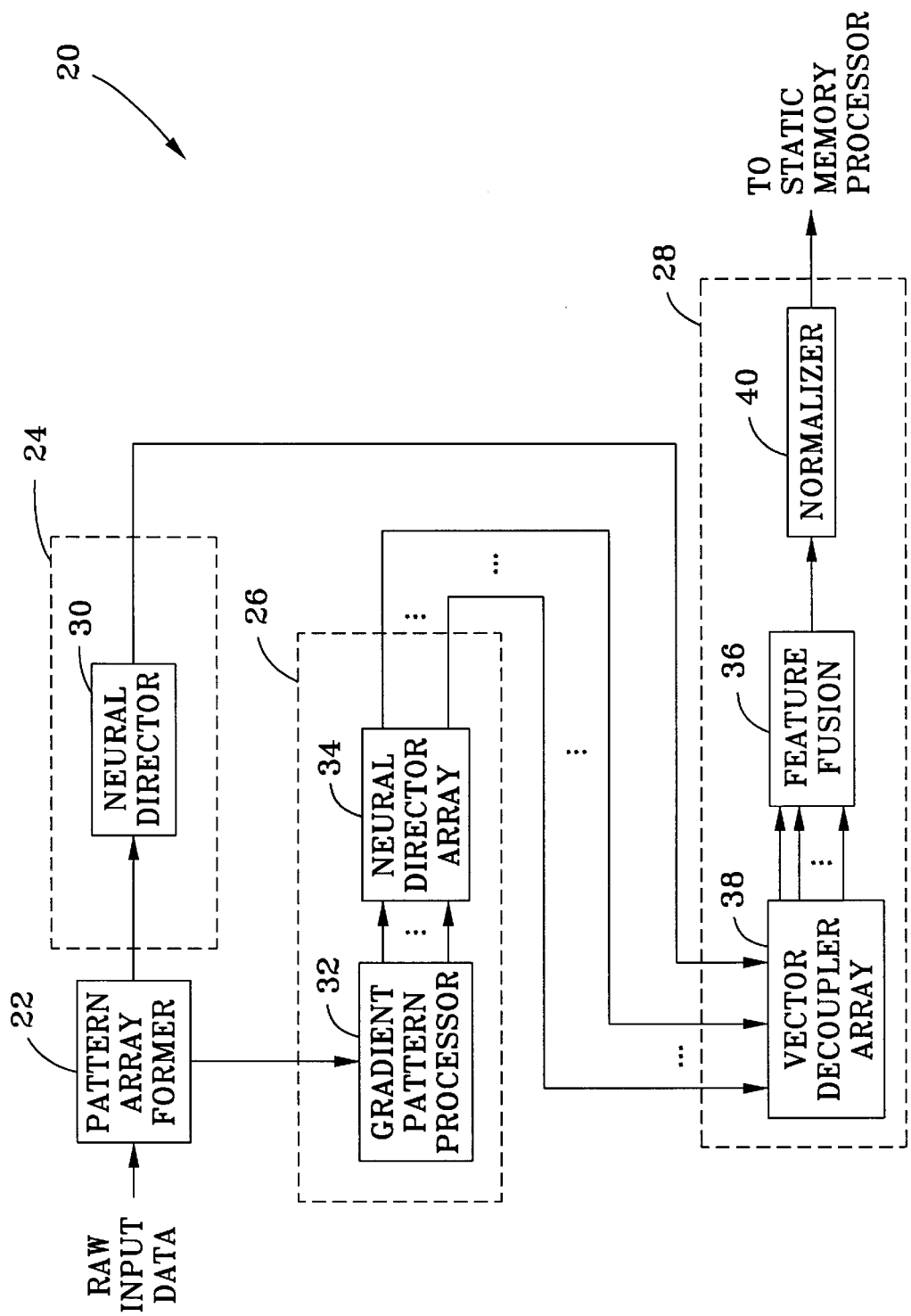
FIG. 2 is a functional block diagram of an illustrative neural sensor used to provide the fused feature vector input to the static memory processor of the present invention.
Figure 4:
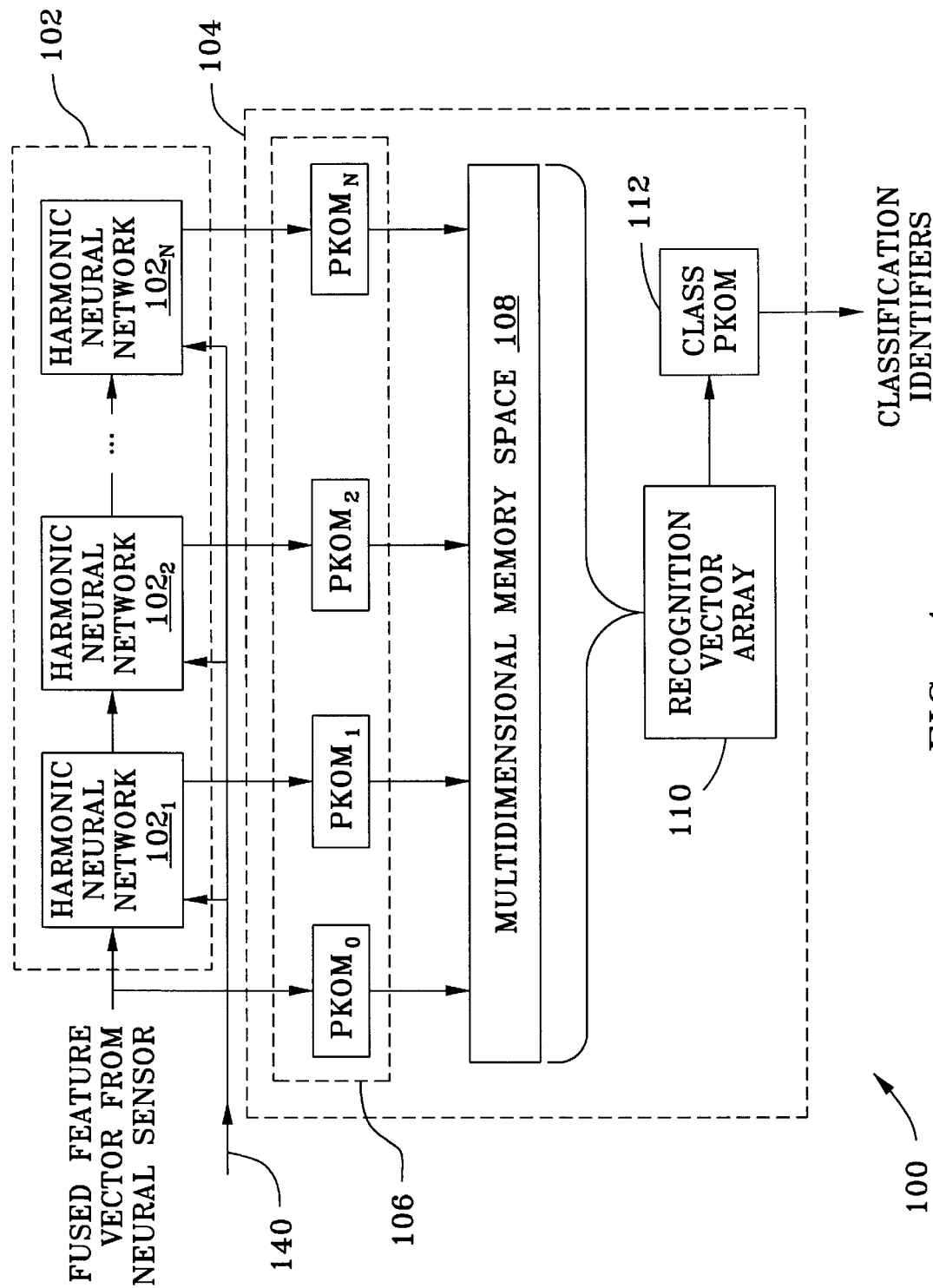
FIG. 4 is a functional block diagram of an illustrative static memory processor.

Referring now to FIG. 2, a block diagram of general neural sensor 20 is shown. The neural sensor 20 receives input data in the form of unpreprocessed real world data, or raw input data, which defines a pattern, e.g., image data, and generates as an output a fused feature vector for the pattern. Through its constructed neural network architecture, neural sensor 20 senses patterns in the raw input data, which determine a direction of the fused feature vector in a multidimensional space. The fused feature vector contains information used in classifying the input pattern. The input data may be a one, two, or multidimensional pattern of data relative to an instant of time, with the dimensionality of the input pattern being dependent upon the specific architecture of the neural sensor. For example, an image pattern may include coordinate, color and intensity data for each pixel of the image. In the block diagram of FIG. 2, pattern array former 22 organizes the raw input data into the proper array format for use in the neural sensor. Neural sensor 20 also includes two sections, a first order processing section 24 and a second order processing section 26, both of which receive the pattern array from array former 22 and generate feature vectors illustrative of features of the input data being classified. In addition, neural sensor 20 includes vector fusion section 28 which receives the feature vectors from the first and second order processing sections 24 and 26 and generates a single fused feature vector which is provided to the static memory processor of the present invention as shown in FIG. 4. The static memory processor generates a pattern classification for the input data to provide pattern recognition. Generally, processing sections 24 and 26, together with fusion section 28, increase input data dimensionality for improved pattern sensitivity, while the static memory processor reduces the data dimensionality into a specific class.

First order processing section 24 includes first order neural director 30 and may include additional elements (not shown) depending on the input pattern to be recognized. Neural director 30 generates an output vector which has an increased dimensionality from the vector representing the pattern array, which aids in discriminating between similar patterns. In parallel with first order processing section 24, second order processing section 26 receives the pattern array from array former 22. Second order processing section 26 includes gradient pattern processor 32 and neural director array 34. Gradient pattern processor 32 forms gradient vectors from the elements of the pattern array. The gradient vector for each element reflects selected differences between that element and its neighboring elements, each gradient containing multiple local frequency or spatial frequency data depending on the form of the raw input data. The number of neighboring elements used to form the gradient vector as well as the differences selected will depend on the specific embodiment of the neural sensor and the structure of the pattern array. The total number "S" of gradient vectors formed generally corresponds to the number of elements in the pattern array. Neural director array 34 has a corresponding number of neural directors, such that each neural director of neural director array 34 is coupled to one gradient vector. As with neural director 30, the outputs of the neural directors of array 34 have an increased dimensionality from their input gradient vectors, which aids in discriminating between similar gradients.

The output vector from first order processing section 24 represents overall features in the input pattern and the output vectors from second order processing section 26 represent features in the gradients in the input pattern. All of the output vectors are coupled to vector fusion section 28, which fuses the output vectors into a single feature vector for provision to the static memory processor. Fusion section 28 includes feature fusion neural director 36, and may also include vector decoupler array 38 and vector normalizer 40. Feature fusion neural director 36 is a standard neural director as described above, having the separate feature vectors as its input array "X" and a fused feature vector as its output array "Y", the fusion being the coupling of each input element with all output elements via the weighting set w(i,j), as is standard for a neural director. Vector decoupler array 38 serves to adjust the values of the feature vectors received from processing sections 24 and 26 by removing any fixed offset which may have been present in the input data. For example, an image on an artificial retina may produce a signal output for each pixel in proportion to the intensity of the local area of the image. Classically, each output is. a uni-polar signal, i.e., zero for black (full dark) and a maximum value for white (full light). The image information is contained in the variance of the signal array, or vector, and not the absolute values of the signal array. If the average signal of all pixels is subtracted from each pixel of the signal array, the array information contained in the variance of the image information becomes better identifiable. Vector decoupler array 38 provides this process in a constructed neural network.

Figure 3A:
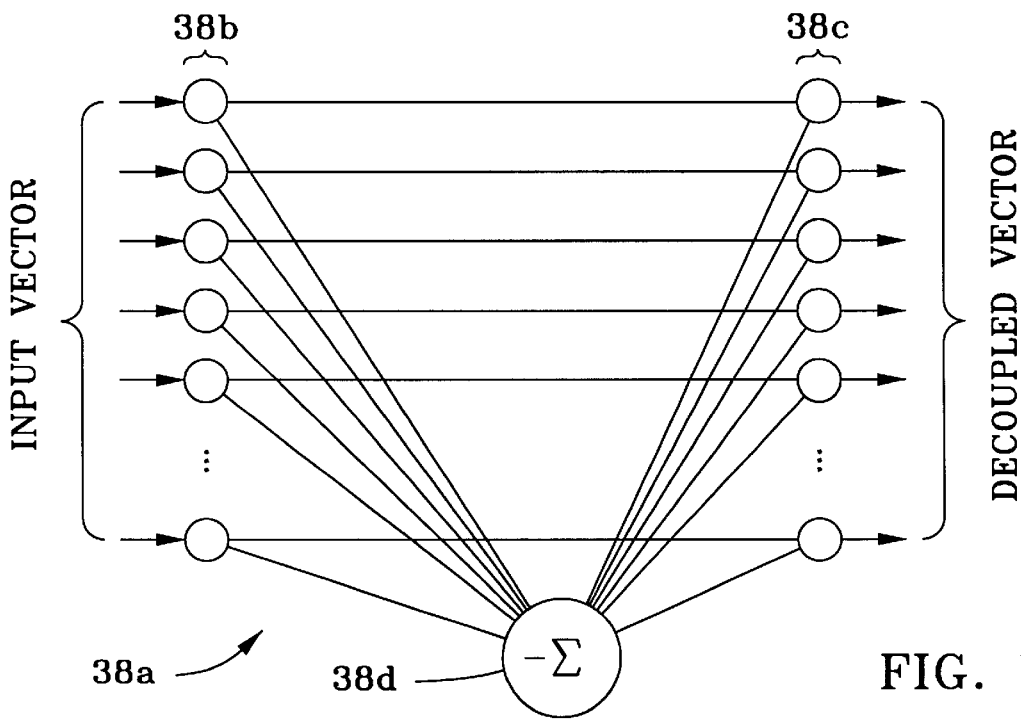
FIG. 3a is a neural schematic illustrating a vector decoupler.

Referring now to FIG. 3a, a neural schematic for one decoupler 38a of decoupler array 38 is shown. Decoupler 38a essentially comprises a plurality of decoupler input elements 38b, a corresponding plurality of decoupler output processing elements 38c and averaging element 38d. Each connection value between decoupler input processing elements 38b and averaging element 38d is equal to the inverse of the number of elements in the input vector for decoupler 38a. Thus averaging element 38d receives and sums the element value multiplied by this inverse value from each input element 38b, the output of averaging element 38d having a negative output function, thus being the average negative element value. Decoupler output processing elements 38c sum the negative average provided by averaging element 38d from the component values provided by the decoupler input processing elements 38b to output the components of a decoupled vector.

Figure 3B:
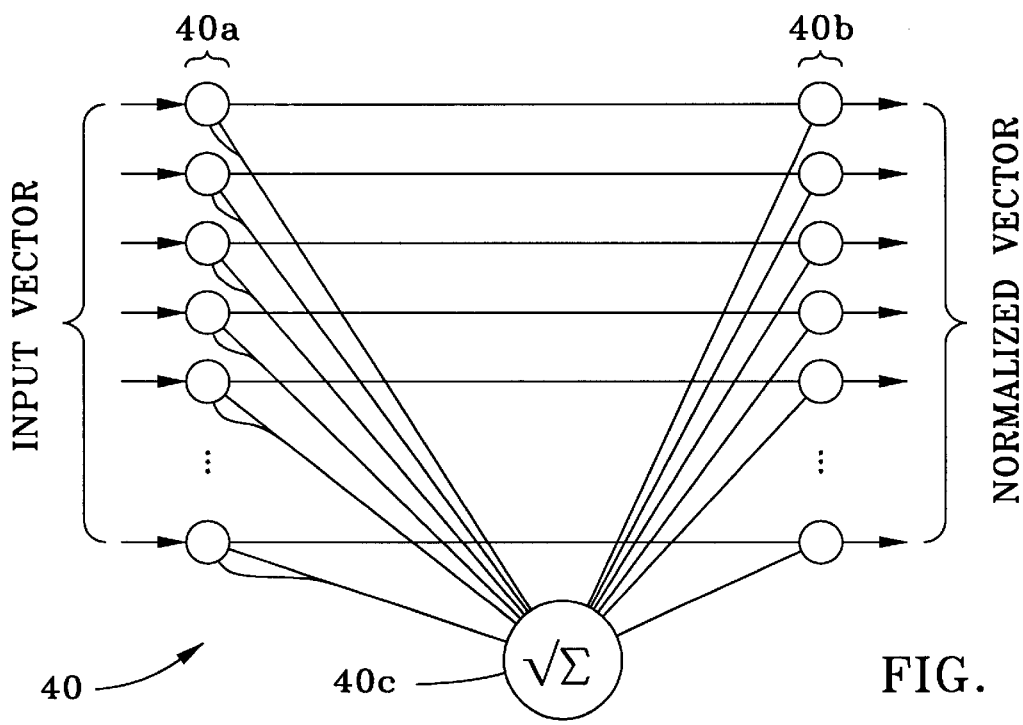
FIG. 3b is a neural schematic illustrating a vector normalizer.

Referring now to FIG. 3b, a neural schematic of normalizer 40 is shown. Normalizer 40 has a structure similar to decoupler 38a. Normalizer 40 comprises a plurality of normalizer input elements 40a and a corresponding plurality of normalizer output processing elements 40b. However, the averaging element 38d of decoupler 38a is replaced with normalizer element 40c. Each normalizer input processing element 40a of normalizer 40 passes a component value of its input vector to a normalizer output processing element 40b and also to normalizing element 40c. The connections between input elements 40a and normalizing element 40c are well known sigma-pi connections so as to provide the square of each element value to normalizing element 40c, which sums the squares. The output function of normalizing element 40c obtains the square root of the sum and controls the output function of output processing elements 40b, for an output gain inverse to the normalizing element 40c. The input processing element values are thereby changed such that output processing elements 40b output the components of a normalized vector.

Referring now to FIG. 4, there is shown a block diagram of static memory processor 100. One of the most important processes of static memory processor 100 is as a feed forward neural network device that reduces a high multidimensional vector into a one dimensional classification representative of said multidimensional vector's direction in space. Static memory processor 100 receives input data in the form of a fused feature vector from neural sensor 20 of FIG. 2 and classifies the received input data into one of a plurality of classes defining a selected class structure. Static memory processor 100 includes multi-layer harmonic neural network 102 and classifier network 104. Multi-layer harmonic neural network 102 includes a series of harmonic neural networks $102_1$ through $102_N$ (generally identified by reference numeral $102_n$), which will be described below in connection with FIG. 5. Generally, each harmonic neural network $102_n$ receives an input vector generated as the output, or feature vector from the preceding harmonic neural network circuit $102_{n-1}$ in the series, with the first harmonic neural network $102_1$ receiving as its input the fused feature vector from neural sensor 20 of FIG. 2. In addition, a neural director output, or feature vector of each harmonic neural network $102_n$ is provided to a corresponding one of the PKOM circuits 106 within classifier network 104, such that $PKOM_n$ receives a feature vector from harmonic neural network $102_n$. Also, fused feature vector from neural sensor 20 of FIG. 2 is provided to a first $PKOM_0$. PKOM circuits 106 are well known devices, also referred to as Winner-Take-All devices. Each PKOM circuit 106 output is a unitary value at a specific position in its Euclidean output space that represents the most simple major direction of its input vector. Generally, the output of each $PKOM_n$ associated with the dimension for which the feature vector component has the highest value is asserted and all other outputs are negated, i.e., $PKOM_n$ effectively generates an active output of one for the output associated with the dimension, or features, having the highest contribution in the feature vector and a zero, or no output, for outputs associated with other dimensions, or features, of the feature vector.

The asserted and negated $PKOM_n$ outputs populate multidimensional memory space 108 of classifier network 104 such that multidimensional memory space 108 contains a memory vector which is a set of $PKOM_N$ sparse activations. Recognition vector array 110 of classifier network 104 reads multidimensional memory space 108. Recognition vector array 110 contains an array of feature recognition vectors, i.e., sparse spatial sets of connections in a highly dimensional space corresponding to predetermined features which the input pattern may contain. When the memory vector of multidimensional space 108 is read by recognition vector array 110, one or more sets of connections, or feature recognition vectors, become activated upon a matching or near matching of the active memory vector or a subset of the active memory vector. The feature recognition vectors within recognition vector array 110 are provided during a training process for static memory processor 100 as further described in connection with FIG. 9.

The activated recognition vectors from recognition vector array 110 are provided to class PKOM circuit 112 of classifier network 104. Class PKOM circuit 112 generates classification identifier outputs, each associated with a class, or a set of features of the input pattern. The classification identifier output associated with the class, or set of features whose likelihood is the highest will have the maximum asserted value. The classification identifier outputs of class PKOM 112 allow for recognition of the input pattern.

Figure 5:
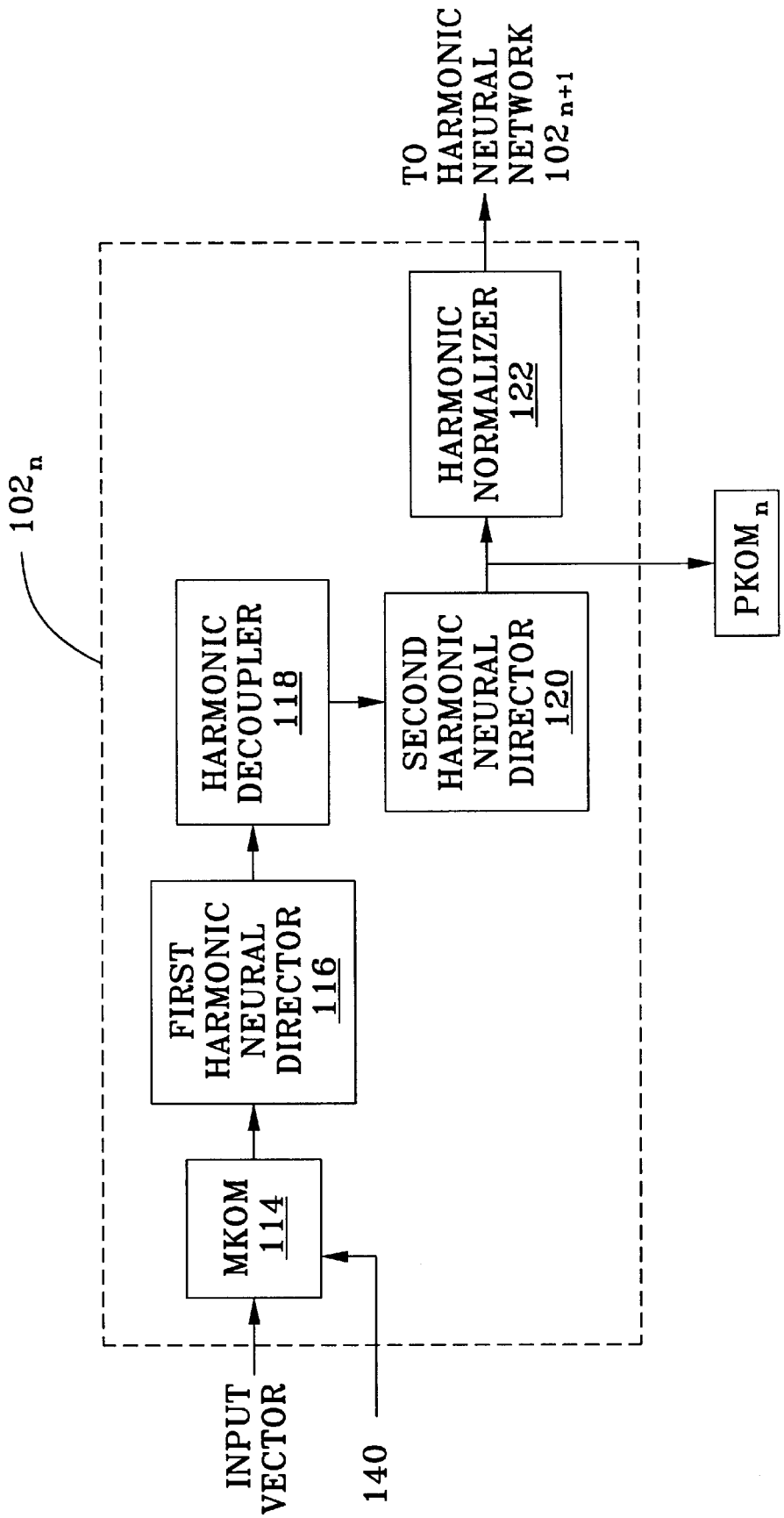
FIG. 5 is a functional block diagram of a harmonic neural network portion of the static memory processor.

Referring now to FIG. 5, a functional block diagram for harmonic neural network $102_n$ is provided. Harmonic neural network $102_n$ receives, as an input vector, the output of the previous harmonic neural network $102_{n-1}$, or, in the case of first harmonic neural network $102_1$, the fused feature vector from neural sensor 20 of FIG. 2. The input vector is received by MKOM 114 of harmonic neural network $102_n$. MKOM 114 generates an ordered set of output elements, each element of the ordered set having a value corresponding to a dimension, or component of the input vector. MKOM 114 is preferably established to provide an output vector whose components are selectively and nonlinearly changed so as to draw the selected set of components towards the dimensionality of the major contributing component. The spatial nonlinear drawing of the MKOM 114 vector towards the major contributing component can be seen by the limit of choosing a smaller and smaller number of a set of components until the selected set is one in which the MKOM becomes a KOM and by a vector directional comparison between the MKOM input and output vectors for each of the MKOM selected sets. The operation of MKOM 114 will be fully described in relation to FIGS. 6–8 below.

The ordered set of elements is provided as input to first harmonic type 2 neural director 116. First harmonic neural director 116 operates in the manner of neural director 10 of FIG. 1 to aid in distinguishing between similar features in the input pattern. As a type 2 neural director, first harmonic neural director 116 is preferably established to provide an output vector whose components are all nonlinearly changed to draw the vector toward a region of the respectively dimensioned space. The output vector from first harmonic neural director 116 is provided to harmonic decoupler 118, which operates in the manner of decoupler 38 of FIG. 3a to remove any fixed offset which may have been present in the output from MKOM 114. The decoupled vector from harmonic decoupler 118 is provided as input to second harmonic neural director 120, which also operates in the manner of neural director 10 of FIG. 1 to aid in distinguishing between similar features in the input pattern. The output of second harmonic neural director 120 is provided to $PKOM_n$ as shown in FIGS. 4 and 5. Additionally, harmonic normalizer 122, operating in the manner of normalizer 40 of FIG. 3b, normalizes the output of second harmonic neural director 120 for provision to the next harmonic neural network $102_{n+1}$. It can be seen from FIG. 4 that the output vector from last harmonic neural network $102_N$ is provided only to $PKOM_N$, there being no next harmonic neural network in that case.

Figure 6:
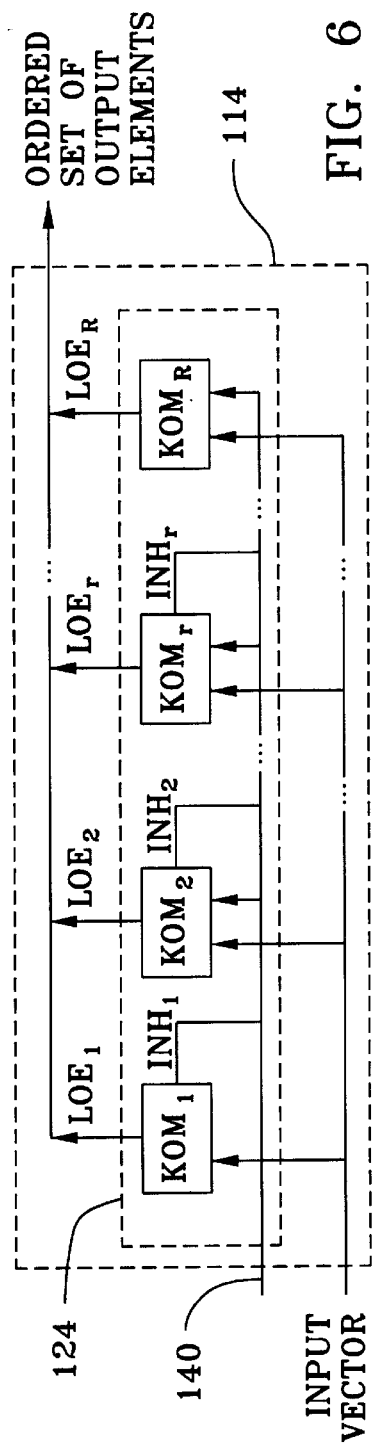
FIG. 6 is a functional block diagram of a multi king of the mountain (MKOM) circuit for use in the harmonic neural network of FIG. 5.

Referring now to FIG. 6, the operation of MKOM 114 in providing the ordered set of output elements is shown as a functional block diagram. MKOM 114 is a nonlinear device that contains equal input and output vector dimensions, but reduces the number of active elements in the output vector. MKOM 114 includes a series of KOM circuits 124, labeled $KOM_1$ through $KOM_R$, or generally $KOM_r$, corresponding to the number "R" of active dimensions, or active elements, of its output vector. The KOM circuits 124 are similar to PKOM circuits, but outputting the value of the element of the input vector having the greatest value, rather than a value of one. The operation of $KOM_r$ will be more fully described in connection with FIG. 7. In the series configuration of FIG. 6, each $KOM_r$ provides a respective local output element ($LOE_r$) as one component of the ordered set of elements. Each $KOM_r$ receives the original input vector and provides a local output element with a value corresponding to the value of the element of the input vector having the greatest value. However, each $KOM_r$ also provides an element inhibit signal (INH) which is passed to succeeding KOM circuits 124, i.e., $KOM_{r+1}$ through $KOM_R$. The inhibit signal for each $KOM_r$ suppresses the activation of the input node corresponding to the local output element $LOE_r$ of $KOM_r$ in the succeeding KOM circuits 124. Thus, with the suppression of all input nodes corresponding to the "r" previous elements having the greatest values, $KOM_{r+1}$ has a local output element, $LOE_{r+1}$, corresponding to the "r+1" th greatest element.

Figure 7:
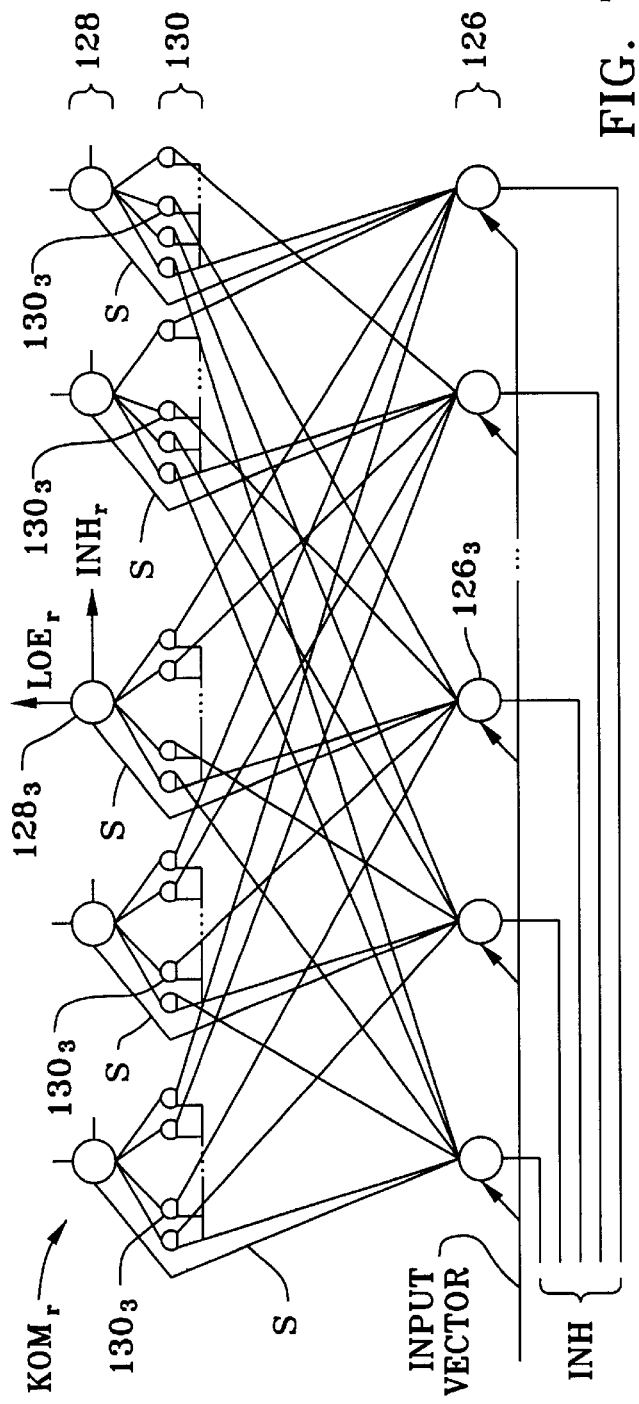
FIG. 7 is a neural schematic illustrating a king of the mountain (KOM) circuit.

Referring now also to FIG. 7, there is shown a neural schematic of $KOM_r$. Each $KOM_r$ contains a plurality of KOM input and output processing elements, 126 and 128, respectively, corresponding to the number of elements in the input vector. Each KOM output processing element 128 has associated with it difference layer nodes 130, the number of difference layer nodes 130 associated with each output element 128 corresponding to one less than the number of input processing elements 126. Each input processing element 126 is connected in a positive global manner to its respective difference layer nodes 130 associated with every other KOM output processing element 128. Each input processing element 126 is further negatively connected in parallel to each of the difference layer nodes 130 associated with its corresponding output processing element 128. In FIG. 7, the difference layer nodes 130 are shown having their positive input to the right and their negative input to the left. To illustrate the connection scheme, connections for input processing element $126_3$ have been denoted in FIG. 7. Input processing element $126_3$ is positively connected to difference layer nodes $130_3$ associated with all output processing elements 128 except output processing element $128_3$, and is negatively connected in parallel to each difference layer node 130 associated with output processing element $128_3$. When any of the outputs of the difference layer nodes 130 associated with one output processing element 128 is a positive value, that output processing element 128 is inhibited, i.e., that output processing element 128 has no output. When all of the outputs of the difference layer nodes 130 associated with one output processing element 128 are negative values, that output processing element 128 is uninhibited, allowing outputs $LOE_r$ and $INH_r$ (shown at output processing element $128_3$ in FIG. 7). Each output processing element 128 is connected to corresponding input processing elements in all succeeding KOM circuits 124 through its INH output connection. Thus, for the case shown in FIG. 7 where output processing element $128_3$ is uninhibited, $INH_r$ inhibits input processing elements $126_3$ in $KOM_{r+1}$, through $KOM_R$. An inhibited input processing element 126 has no output, thus its corresponding output processing element 128 has no output. Finally, each input processing element 126 is connected to its corresponding output processing element 128 via connection "S". Thus, when output processing element 128 is uninhibited, output $LOE_r$ is the value of connection "S" times its input element. All of the connections "S" within a single $KOM_r$ have the same value, with the connections "S" across all KOM circuits 124 comprising shading elements to form a window function for the output of MKOM 114. For example, equal values for connections "S" for all KOM circuits 124 comprises a square window function, i.e., the values of the ordered set of output elements will each be in the same proportion to the values of the input vector elements. In practice, the selected window function, or the variation in "S" between consecutive KOM circuits 124, can be of any selected shape, including a linear ramp, a Hamming window, or a cosine to a power. The only requirements being that the "S" connection for $KOM_1$ provides the full value of its input elements; that each succeeding "S" connection provide successively smaller portions of its input elements; and that the "S" connection for $KOM_R$ provides the smallest and virtually negligible portion of its input elements. The "S" connection values for MKOM 114 are fixed upon construction. It is also noted that the construction of $KOM_r$ shown in FIG. 7 provides an ordered set of positive element values. To obtain an ordered set of both positive and negative values, a second parallel MKOM 114 is required in which the positive and negative connections between input processing elements 126 and difference layer nodes 130 are switched from that shown in FIG. 7. MKOM 114 as described has a fixed degree of nonlinearity which is dependent primarily upon the parameters "R" and "S".

Figure 8:
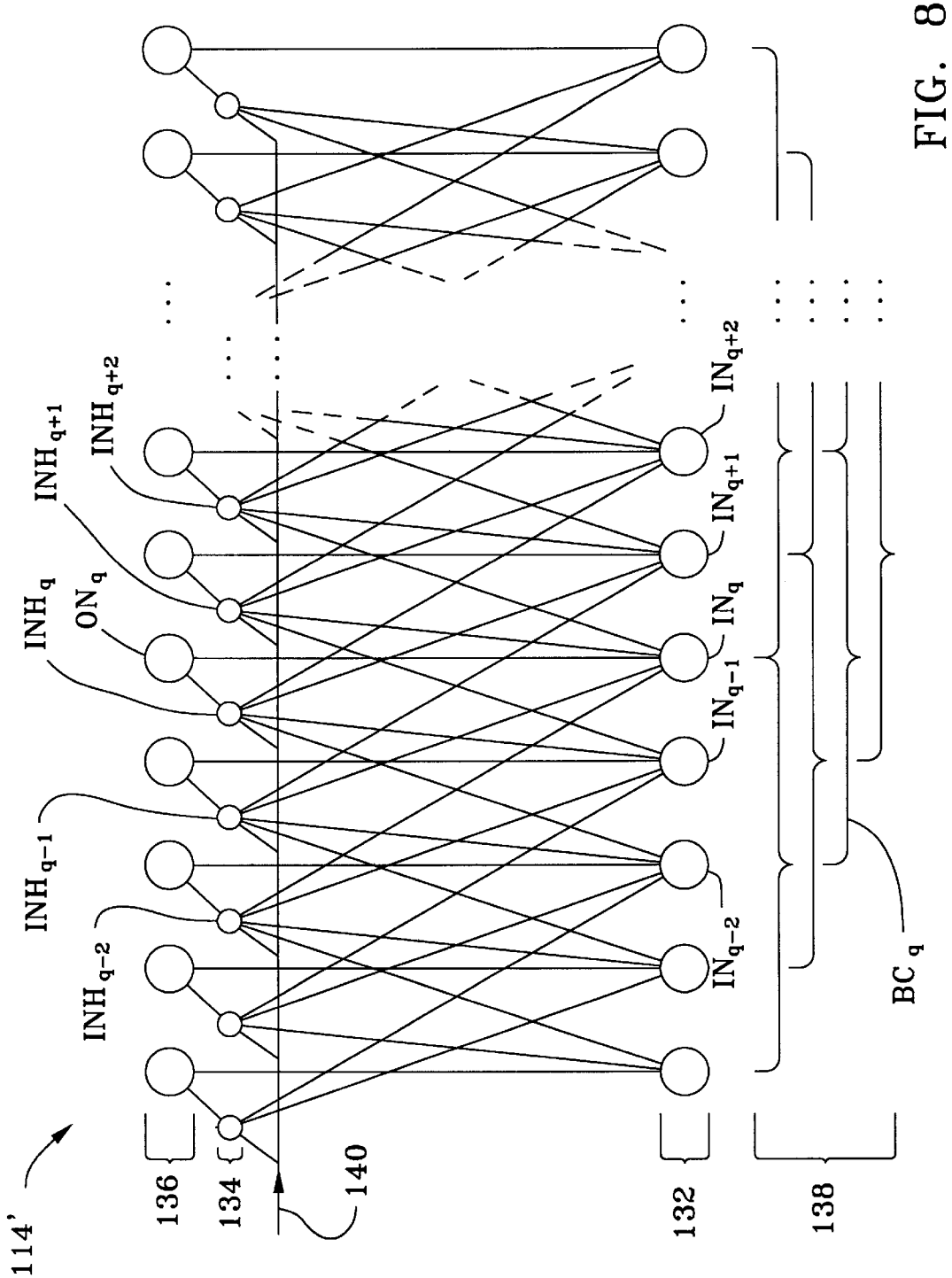
FIG. 8 is a neural schematic illustrating a preferred embodiment for a MKOM circuit.

In actual applications of static memory processor 100, the input vector would commonly have a large number of elements, thus requiring correspondingly large numbers of connections and nodes for MKOM 114 and $KOM_r$. A preferred embodiment which would reduce the number of connections, and thus decrease the processing requirements, would have a single set of input nodes 126, each receiving its corresponding component of the input vector and interacting only with a limited set of its neighboring input nodes, thus not requiring a full set of input nodes for each $KOM_r$. FIG. 8 provides a neural schematic of MKOM 114' for this preferred embodiment. In comparing MKOM 114' of FIG. 8 with MKOM 114 of FIG. 6, it can be seen that the series of KOM circuits 124 has been eliminated and the neural schematic for this embodiment is greatly simplified. MKOM 114' has three sets of neurons, MKOM input neurons 132, MKOM inhibit neurons 134 and MKOM output processing neurons 136. The number of neurons in each set corresponds to the number of elements in the input vector. The breadth of the nearest neighbor connections, indicated by overlapping brackets 138 in FIG. 8, is a design constraint that dictates the maximum size of the local area of inhibition as will be explained hereafter. This design constraint depends upon the dimension of the input vector and the dimensionality of the output space as defined by the preceding neural director in the signal path, e.g., for MKOM 114 of FIG. 5, the preceding neural director would be second harmonic neural director 120 of harmonic neural network $102_{n-1}$. The design constraint may also be viewed as a ratio between the number of MKOM output neurons 136 and the number of linear independent elements of a basis vector set that could represent the MKOM 114' output space dimensionality. In a very high input/output dimensionality MKOM with a high relative ratio of the dimensionalities, i.e., the output space of the MKOM has a large number of neurons when compared to the dimensionality of the output space, the breadth of the connectivity requirements become very local. For example, the embodiment of FIG. 8 shows the breadth of connectivity as five neurons. Conversely, in a MKOM of low dimensionality and a relatively close ratio of dimensionalities, i.e., the output space has relatively the same number of neurons when compared to the output space dimensionality, the breadth of connectivities will approach all neurons, thus making the embodiment of FIG. 6 possibly more desirable.

Referring more specifically to FIG. 8, it is to be noted that a two dimensional depiction of MKOM 114' is provided, with sets of nearest neighbor connections 138 shown in a consecutive fashion. In actuality, the connectivities include nearest neighbor connections in a multidimensional space, which are defined by the weighting set vectors w(i,j) of the preceding neural director in the signal path, as previously stated. MKOM 114' of FIG. 8 is shown in a two dimensional depiction to aid in comprehension of the connectivities. The connections for MKOM 114' will be described in relation to one of the MKOM input neurons 132, designated $IN_q$ in FIG. 8. $IN_q$ is connected directly to its corresponding MKOM output neuron 136, designated $ON_q$ in FIG. 8. Each MKOM output neuron 136 is connected to an associated MKOM inhibit neuron 134, designated $INH_q$ for MKOM output neuron $ON_q$, through a negative unit connection. In addition, MKOM input neuron $IN_q$ is connected to the MKOM inhibit neurons, $INH_{q-2}$, $INH_{q-1}$, $INH_{q+1}$, $INH_{q+2}$, etc., within its breadth of connectivity, shown as brackets $BC_q$ in FIG. 8, and similarly, MKOM inhibit neuron $INH_q$ is connected to the MKOM input neurons, $IN_{q-2}$, $IN_{q-1}$, $IN_{q+1}$, $IN_{q+2}$, etc. It is to be noted that, as the preceding neural director is a constructed neural network, the weighting set is known, such that the nearest neighbors encompassed within the breadth of connectivity $BC_q$, can be determined. MKOM output neuron $ON_q$ has an output activation function that is linear for all positive values and zero for all others. The input activation rule for MKOM inhibit neurons 134 operates in the manner of a "diode OR", i.e., for $INH_q$, only the highest input activation from MKOM input neurons $IN_{q-2}$, $IN_{q-1}$, $IN_{q+1}$ and $IN_{q+2}$ passes to output neuron $ON_q$. In addition, inhibit neurons 134 are each connected to external control 140 which is also indicated in FIGS. 4 and 5. For the embodiment of FIG. 8, external control 140 adjusts the output function gain for inhibit neurons 134. For example, a high inhibit value will produce a single output of the highest activation with an activation a proportion of the value of the preceding, or input, neural director. An inhibit value of zero produces no inhibition and thus, the positive output activations produce the same direction output vector as the positive activations of the input neural director. External control 140 can be seen to control the degree of nonlinearity exhibited by MKOM 114'. An input vector to MKOM 114' with an inhibit value at external control 140 will produce an activation pattern in the MKOM 114' output space where the maximum activated output neuron, e.g., $ON_q$, and its nearest neighbors have a close match to the input pattern. As all other output neurons 136 are lower in output value than maximum output neuron $ON_q$ by definition, a proportional inhibit signal to all $ON_q$ nearest neighbors will reduce their outputs. The $ON_q$ nearest neighbor activations in turn inhibit other lesser neuron outputs (their nearest neighbors), and so on until all active neurons are covered with an inhibit action without any direct connection from the maximum activated output neuron $ON_q$. Unlike MKOM 114 of FIG. 6, where a window function is chosen for connections "S", external control 140 of MKOM 114' produces a natural window function. Like MKOM 114 of FIG. 6, a polarity reversal of MKOM 114' is required to produce an ordered set of negative values. With a parallel MKOM 114' of reversed polarity, an inhibit value of zero produces no inhibition and the output activations produce the same direction output vector as the input neural director.

While the architectural components of static memory processor 100 are developed a priori as described above, the connections for the recognition vector array 110 and the corresponding predetermined classifications of class PKOM 112 require training of static memory processor 100 as follows. Learning is accomplished with a single application of an input pattern. An input pattern with a known class is provided to an appropriate neural sensor 20 and the fused feature vector output of neural sensor 20 is then input to static memory processor 100. As described above, PKOM circuits 106 within classifier network 104 populate memory space 108 with a set of sparse activations.

Figure 9:
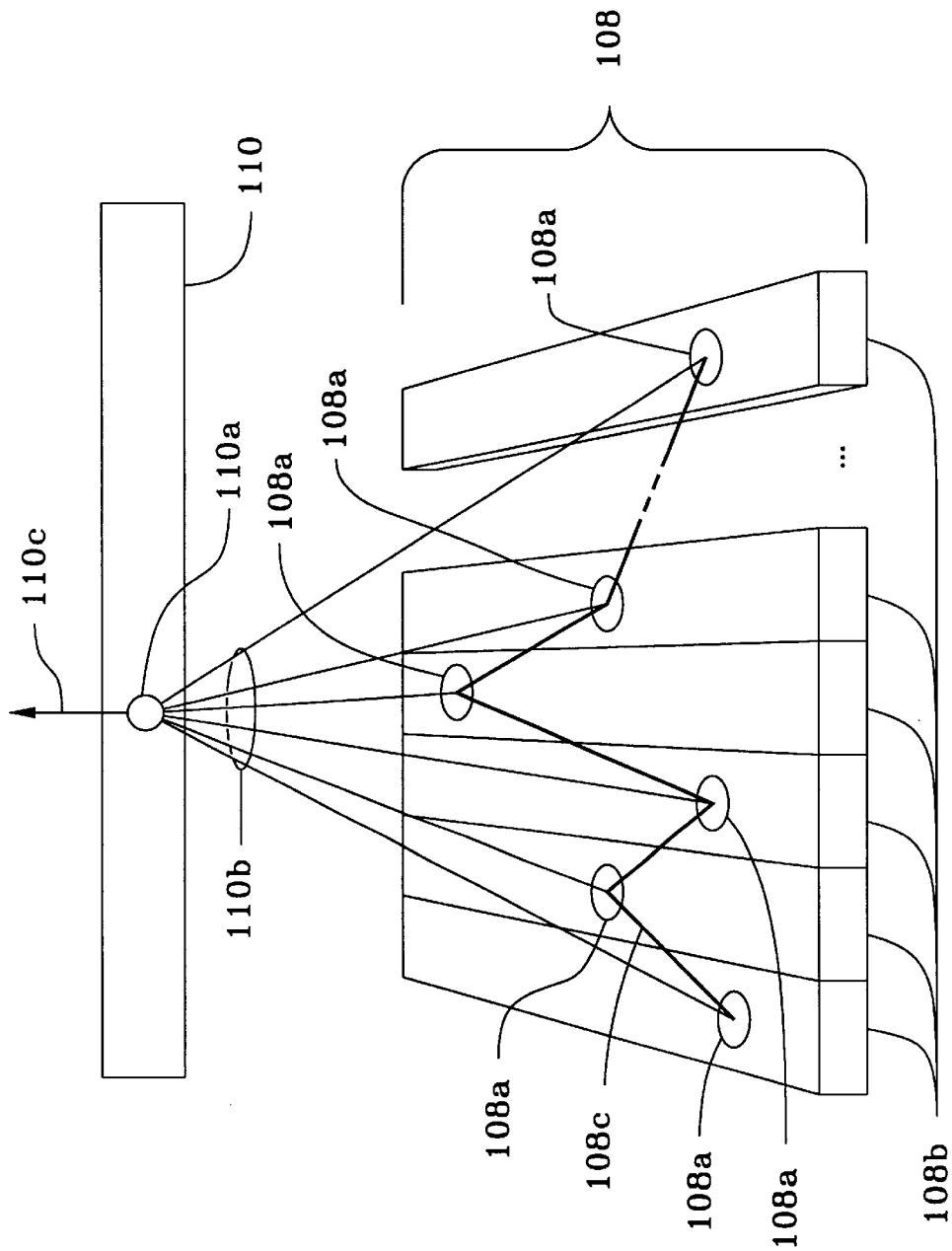
FIG. 9 is a schematic representation of a multidimensional memory space and a recognition vector array of the static memory processor.

Referring now to FIG. 9, there is shown a schematic representation of populated, multidimensional memory space 108 and recognition vector array 110. Each ellipse 108a signifies an active $PKOM_n$ output at a memory location in a multidimensional memory subspace 108b, with each memory subspace 108b representative of the output dimensionality of the neural director of the harmonic neural network $102_n$ corresponding to $PKOM_n$. Thus each ellipse 108a is associated with the output dimension of each memory subspace 108b, or a set of features of the input pattern, having the highest contribution in the feature vector. Associative matched unitary connections are applied between each populated memory location 108a and an unassigned neuron 110a of recognition vector array 110 forming connection set 110b. Unassigned neuron 110a is one of a plurality of neurons (not shown) within recognition vector array 110. Neuron 110a with its connection set 110b becomes a recognition vector of recognition vector array 110, corresponding to the active memory pattern as illustrated by line 108c. Thus, the neuron 110a and a set of connections 110b which contains a representation of a known memory vector pattern 108c is in actuality a replica-correlator neural circuit. Recognition vector output 110c is then provided to class PKOM 112. The position determined by class PKOM 112 for recognition vector output 110c is assigned a unique value, which serves as the classification identifier for the input pattern. Thus, whenever an input pattern for which the static memory processor has been trained is received, class PKOM 112 provides a unique, predetermined value, or classification identifier, corresponding to the classification of the input pattern. The above process is repeated as required for all initial training or for the retraining of a new classification for the static memory processor 100. It will be appreciated that the architecture of the static memory processor 100 allows trained connections to be loaded from another static memory processor 100 such that a complete static memory processor 100 may be manufactured a priori.

Thus, for a given feature vector output of a neural sensor resulting from a pattern input to the neural sensor, the static memory processor of the present invention provides a classification identifier for the input pattern. The feature vector is input to a plurality of harmonic neural networks which generate an ordered set of output vectors. The nonlinearity of the plurality of harmonic neural networks provides an increased sensitivity to slight differences in similar input patterns. Each output vector of the ordered set is provided to a PKOM circuit which, in turn, populates a memory space corresponding to the dimensionality of the component having the highest value of each output vector. A recognition vector associated with the populated memory space is activated within a recognition array. The recognition vector is processed through a class PKOM which outputs the classification identifier corresponding to the activated recognition vector. The static memory processor is capable of learning a classification in a single application of an input pattern and can learn a new classification without relearning previously learned data. Further, a static memory processor trained to recognize a certain classification of input patterns can be used as a template for additional static memory processors which will recognize members of the same input pattern classification without training.

Figure 10:
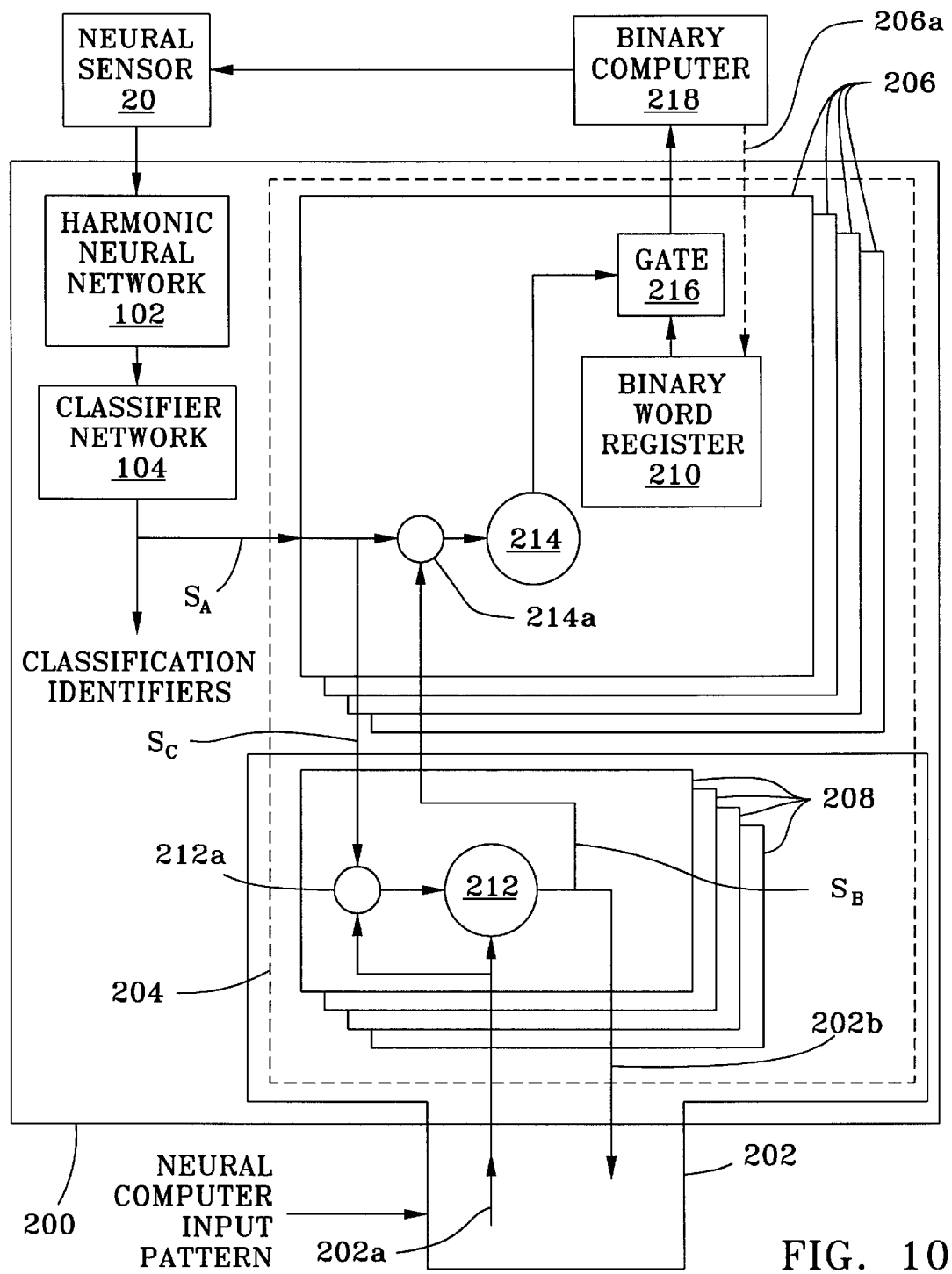
FIG. 10 is a schematic representation of a neural and binary computers interface neural network embodiment of the present invention.

Although the static memory processor of the present invention has been described relative to a specific embodiment thereof, it is not so limited. For example, when the neural sensor is configured to be a binary word sensor, the static memory processor can be utilized to provide a bidirectional interface between neural and binary computers. A binary computer is defined herein as a computer containing, at a minimum, memory and/or processing using at least two logic states. Referring now to FIG. 10, there is shown a schematic representation of a neural and binary computers interface neural network embodiment 200, referred to herein as NBI 200. NBI 200 has a slight variation in the assignment of the classification as compared to the above training. The interfaced neural computer 202 and the classifier network 104 each must be previously trained according to their design. In addition, a neuron must be added to neural computer 202 as will be explained further. The training for NBI 200 requires both neural computer 202 and NBI 200 to be active with equal representative input patterns, i.e., the classification path 202a of neural computer 202 to be associated with a particular input pattern representative of a binary word must be active at the time NBI 200 receives the binary word input pattern. As an example, the input pattern to neural computer 202 would be the image of a dog, while the input pattern to NBI 200 would be the binary word for dog. The training of NBI 200 is the same as the training of a standard static memory processor 100 up through the application of the associative matched unitary connections between each populated memory location 108a and an unassigned neuron 110a of recognition vector array 110 and the provision of a classification identifier by class PKOM 112 as described above for FIG. 9. From this point in the training the new associative unitary connections allow a common activation path from multidimensional memory space 108 to pass through the neuron 110a, through class PKOM 112 and into interface 204 of NBI 200, indicated as signal pattern $S_A$ from classifier network 104 of NBI 200. Interface 204 contains a plurality of interface circuit pairs 206, 208. Each interface circuit pair 206, 208 is associated with a binary computer input and a corresponding neural computer input, respectively, to be interfaced. A class PKOM 112 activation without an assigned binary interface circuit 206 triggers a training mode. This unassigned training mode activation allows the binary word input pattern to be loaded into binary word register 210 of binary interface circuit 206 via training path 206a. The binary word, then, is the exact class of the input pattern. Since neural computer 202 is active with its corresponding and representative input pattern, neural computer 202 has an activation input signal path 202a which activates classification neuron 212 to provide classification output signal 202b to represent the input pattern to neural computer 202. It can be seen from FIG. 10 that neural interface circuit 208 is a component of interface 204 which resides in neural computer 202 and contains a classification neuron 212 of neural computer 202 and a neural interface/inhibit element 212a. Neural interface/inhibit element 212a is added to neural computer 202 as part of NBI 200 to perform as an inhibit and interface neuron to a corresponding classification neuron 212 to allow communication to propagate from interface circuit 206 to neural computer 202. Interface 204 encompasses a plurality of neural interface circuits 208 of neural computer 202. Each neural interface circuit 208 is connected via activation input signal path 202a, through neural computer processing element 212 and classification output signal 202b. As a result of the pairing of interface circuits 206 and 208, each neural interface circuit 208 corresponds to a binary interface circuit 206 upon completion of the NBI 200 training process. New associative neural memory connections, denoted $S_B$ and $S_C$, well known Hebbian connections which connect two active elements, are assigned between binary interface circuit 206 and the corresponding neural interface circuit 208 when co-activated during a interface 204 training mode. Each binary interface circuit 206 contains binary word register 210, binary neural processing element 214 binary interface/inhibit element 214a and gate 216. The associative connection $S_B$ is formed between active neural computer processing element 212 output and active binary interface/inhibit element 214a. The associative connection $S_C$ is formed between classifier 104 via binary interface circuit 206 and neural interface/inhibit element 212a. The above process is repeated for each new binary word and input pattern to be learned.

In operation, an input pattern to neural computer 202 activates a signal path which includes activation input signal 202a, processing element 212 of neural interface circuit 208 and activation output signal 202b. As a result of connection $S_B$, binary interface/inhibit element 214a and binary neural processing element 214 are activated in the corresponding interface circuit 206. The output of binary neural processing element 214 activates gate 216, allowing the binary word associated with neural computer 202 input pattern to load from binary word register 210 into binary computer 218. Similarly, a binary word input pattern into neural sensor 20 is processed through multi-layer harmonic neural network 102 and classifier network 104 of NBI 200, resulting in the output of classification identifiers. The classification identifiers are provided to the corresponding interface circuit 206 as signal pattern $S_A$, as described above for the training mode. Connection $S_C$ can then activate interface neural processing element 212 through neural interface/inhibit element 212a within neural interface circuit 208 which provides activation output signal 202b to complete processing within neural computer 202 as would a corresponding input pattern to neural computer 202. Neural interface/inhibit element 212a added to neural computer 202 and binary interface/inhibit element 214a are used to prevent neural computer 202 and binary computer 218 from attempting to communicate simultaneously with interface circuits 206, 208. Activation input signal 202a is seen to be provided to both neural computer processing element 212 and its associated interface/inhibit element 212a. Interface/inhibit element 212a inhibits connection $S_C$ from neural computer processing element 212 when activation input signal 202a is present. Likewise, inhibit element 214a inhibits signal $S_B$ from binary neural processing element 214 when connection $S_A$ is activated. It will be noted, however, that activation input signal 202a is not inhibited by interface/inhibit element 212a as it is also directly connected to neural computer processing element 212. In this manner, the operation of neural computer 202 is not interrupted.

Thus, upon the completion of training, neural computer 202 can activate the associative binary word register 208 which is transmitted to binary computer 218. Binary computer 218 can activate an associative neural activation in neural computer 202 equivalent to the input binary word. These bidirectional activations of NBI 200 allow each computer to receive and transmit in their respective "languages".

It will be appreciated that a number of additional modifications may be made to static memory processor 100 depicted in FIG. 4. For example, the classifier network 104 may include MKOM circuits in place of PKOM circuits 106. In addition, harmonic neural network 102 may include a single neural director, preferably second harmonic neural director 120, instead of first and second harmonic neural directors 116 and 120. Also, either or both harmonic decoupler 118 and harmonic normalizer 122 need not be present in harmonic neural network 102 depending on the input pattern to be received. Further, the NBI 200 can easily be changed from an interface circuit to a cooperating pair of digital and neural processing systems, where each system contributes equally in their own way to a recognition and classification of different inputs from a common source. In this embodiment each interface/inhibit element 212a, 214a becomes a power neuron where the output level is greater than the sum of the two inputs. As a power neuron, interface/inhibit element 212a provides an extra high level activation for a neural computer 202 classification, when both systems provide simultaneous identical classifications. Interface/inhibit element 214a as a power neuron provides an increased output via processing element 214 and gate 216 to provide an at least one bit indication to the word data to indicate to binary computer 218 that neural computer 202 also provided an identical classification.

The invention as described herein provides a number of advantages. Particularly, the static memory processor provides a memory processing architecture for a variety of types of sensors which can generate an output feature pattern from input data without training or learning as would be required for a conventional neural network. Thus, it will be understood that many additional changes in the details, steps and arrangement of parts, which have been herein described and illustrated in order to explain the nature of the invention, may be made by those skilled in the art within the principle and scope of the invention as expressed in the appended claims.

What is claimed is:

1. A static memory processor in combination with a neural sensor, the neural sensor receiving an input data pattern and outputting a feature vector to the static memory processor, the feature vector containing information on sets of features of the input data, the static memory processor comprising:

a plurality of harmonic neural networks connected in series, each harmonic neural network receiving an input vector and outputting a fused feature vector containing information on one of the sets of features of the input data and further outputting a processed fused feature vector as the input vector to a succeeding harmonic neural network, a first in the series of harmonic neural networks receiving the fused feature vector as its input vector; and a classifier network receiving the focused feature vectors, activating recognition vector arrays in response to the received fused feature vectors and generating classification identifiers allowing for recognition of the input data pattern.

2. The static memory processor of claim 1 wherein each harmonic neural network further comprises:

a MKOM circuit receiving the input vector and providing an ordered set of output elements;

at least one harmonic neural director receiving the ordered set of output elements and outputting the focused feature vector; and a harmonic normalizer receiving the focused feature vector and outputting the processed feature vector.

3. The static memory processor of claim 2 wherein at least one of the harmonic neural networks further comprises a harmonic decoupler removing a fixed offset present in the ordered set of output elements.

4. The static memory processor of claim 2 further comprising an external control to the MKOM circuit operating on the ordered set of output elements in accordance with a degree of nonlinearity.

5. The static memory processor of claim 2 wherein the MKOM circuit further comprises a plurality of KOM circuits connected in series, each KOM circuit outputting one element of the ordered set of output elements corresponding to the order of each KOM circuit within the series of KOM circuits.

6. The static memory processor of claim 5 wherein each KOM circuit further comprises:

a set of input processing nodes corresponding in number to elements of the input vector, each input processing node expressing a value of its corresponding input vector element;

a corresponding set of output processing nodes;

a set of KOM connections separately connecting each input processing node to its corresponding output processing node; and a plurality of difference nodes associated with each output processing node, each difference node having polarized inputs, each input processing node connected in parallel to one of the polarized inputs of the plurality of difference nodes associated with the corresponding output processing node and each input processing node further connected to an oppositely polarized input of one of the difference nodes associated with each non-corresponding output processing nodes, each plurality of difference processing nodes providing a difference output to its respective output processing node, the difference output inhibiting the KOM connection between the associated output processing node and the corresponding input processing node when the value expressed by the input processing node is not the largest value of the plurality of input processing nodes and activating the KOM connection when the value expressed by the input processing node is the largest value, the activated KOM connection allowing the output processing node to output the one element of the ordered set of output elements.

7. The static memory processor of claim 6 wherein each KOM circuit further comprises an inhibit connection between each output processing node and corresponding input processing nodes in succeeding KOM circuits, the inhibit connection being activated when the KOM connection is activated, the activated inhibit connection inhibiting the corresponding input processing nodes in succeeding KOM circuits from expressing the value of the input vector element.

8. The static memory processor of claim 6 wherein the set of KOM connections for each KOM has a value corresponding to a predetermined function value, the ordered set of output elements conforming to the predetermined function.

9. The static memory processor of claim 2 wherein the MKOM circuit further comprises:

a set of input processing neurons corresponding in number to elements of the input vector, each input processing neuron expressing a value of its corresponding input vector element;

a corresponding set of output processing neurons, each input processing neuron being connected directly to its corresponding output processing neuron; and a corresponding set of inhibit neurons, each inhibit neuron connected through a negative unit connection to its corresponding output processing neuron, each inhibit processing neuron further connected to its nearest neighbor set of input processing neurons, each inhibit neuron passing a value corresponding to the highest value expressed by the nearest neighbor set to the corresponding output processing neuron, the output processing neuron outputting a sum of the value expressed by the corresponding input processing neuron and the value passed by the corresponding inhibit neuron to provide the ordered set of output elements.

10. The static memory processor of claim 9 further comprising an external control to the MKOM circuit operating equally on the value passed by each of the inhibit neurons.

11. The static memory processor of claim 1 wherein the classifier network further comprises:

a first PKOM circuit receiving the feature vector and outputting a first unitary value at a position representing a highest contributing direction of the feature vector;

a plurality of additional PKOM circuits, each additional PKOM circuit receiving one of the focused feature vectors and outputting an additional unitary value at an additional position representing a highest contributing direction of its focused feature vector;

a multidimensional memory space partially populated by the unitary values outputted by the first and additional PKOM circuits;

a recognition vector array, the partially populated multi-dimensional memory space activating a set of recognition vectors within the recognition array; and a class PKOM circuit outputting the classification identifier at a position representing a highest contributing direction of the set of recognition vectors.

12. The static memory processor of claim 1 further comprising an interface, the interface allowing neural network activations in a neural computer to activate corresponding binary words in a binary computer and further allowing binary words in the binary computer to activate corresponding neural network activations in the neural computer.

13. The static memory processor of claim 12 wherein the interface further comprises:

a plurality of binary interface circuits, each binary interface circuit associated with one of the binary words;

a plurality of neural interface circuits, each neural interface circuit associated with one of the neural network activations;

a first connection between each binary interface circuit and the classifier network such that each binary interface circuit receives the classification identifiers for the associated binary word;

a second connection between each binary interface circuit and the binary computer for transferring the associated binary word to the binary computer;

a third connection to and from each neural interface circuit and the corresponding activations of the neural computer for the associated binary word, the corresponding activations of the neural computer being directed through the third connection; and a fourth connection to and from the binary interface circuit for the associated binary word and the neural interface circuit for the corresponding activations of the neural computer for the associated binary word.

14. The static memory processor of claim 13 wherein each binary interface circuit further comprises:

a binary word register containing the associated binary word;

a gate circuit within the second connection, the gate circuit allowing the transfer of the associated binary word from the binary word register to the binary computer when the gate circuit is activated and preventing the transfer of the associated binary word from the binary word register to the binary computer when the gate circuit is not activated; and a binary neural processing element controlling the activation of the gate circuit, the binary neural processing element activating the gate when a signal is present on at least one of the first and third connections.

15. The static memory processor of claim 14 wherein each binary interface circuit further comprises an inhibit element preventing interference of signals on the first and third connections at the binary neural processing element.

16. The static memory processor of claim 14 wherein each neural interface circuit further comprises a first inhibit element preventing interference of signals on the third connection with the activations of the neural computer.

17. The static memory processor of claim 16 wherein each binary interface circuit further comprises a second inhibit element preventing interference of signals on the first and third connections at the binary neural processing element.

18. The static memory processor of claim 13 wherein each neural interface circuit further comprises a neural computer processing element, the third and fourth connections being through the neural computer processing element, the fourth connection from the binary interface circuit to the neural computer processing element activating the third connection from the neural computer processing element to the neural computer activations, the third connection from the neural computer activations to the neural computer processing element activating the fourth connection from the neural computer processing element to the binary interface circuit.

19. An interface in combination with a classifier network providing a classification identifier which can correspond with one of a plurality of binary words input from a binary computer, the interface allowing neural network activations in a neural computer to activate the corresponding binary word in the binary computer and further activating one of a plurality of neural network activations in th neural computer, the interface comprising:

a plurality of binary interface circuits, each binary interface circuit associated with one of the binary words;

a plurality of neural interface circuits, each neural interface circuit associated with one of the neural network activations;

a first connection between each binary interface circuit and the classifier network such that each binary interface circuit receives the classification identifiers for the associated binary word;

a second connection between each binary interface circuit and the binary computer for transferring the associated binary word to the binary computer;

a third connection to and from each neural interface circuit and the corresponding neural network activation of the neural computer for the associated binary word, the corresponding neural network activation of the neural computer being directed through the third connection; and a fourth connection to communicate bi-directionally between the binary interface circuit for the associated binary word and the neural interface circuit for the corresponding neural network activation of the neural computer for the associated binary word.

20. The static memory processor of claim 19 wherein each binary interface circuit further comprises:

a binary word register containing the associated binary word;

a gate circuit within the second connection, the gate circuit allowing the transfer of the associated binary word from the binary word register to the binary computer when the gate circuit is activated and preventing the transfer of the associated binary word from the binary word register to the binary computer when the gate circuit is not activated; and a binary neural processing element controlling the activation of the gate circuit, the binary neural processing element activating the gate when a signal is present on at least one of the first and third connections.

21. The static memory processor of claim 20 wherein each neural interface circuit further comprises a neural computer processing element, the third and fourth connections being through the neural computer processing element, the fourth connection from the binary interface circuit to the neural computer processing element activating the third connection from the neural computer processing element to the neural computer activations, the third connection from the neural computer activations to the neural computer processing element activating the fourth connection from the neural computer processing element to the binary interface circuit.

22. The interface of claim 21 further comprising:

a first inhibit element preventing interference of signals on the first and third connections at the binary neural processing element.

a second inhibit element preventing interference of signals on the third connection with the activations of the neural computer at the neural computer processing element.

* * * * *

UNITED STATES PATENT AND TRADEMARK OFFICE
CERTIFICATE OF CORRECTION

| | |
|---|---|
| PATENT NO. | : 6,735,579 B1 |
| APPLICATION NO. | : 09/477638 |
| DATED | : May 11, 2004 |
| INVENTOR(S) | : Roger L. Woodall |

Page 1 of 1

It is certified that error appears in the above-identified patent and that said Letters Patent is hereby corrected as shown below:

Col. 1, Line 14, replace "Sensors 09/477,653" with --Sensors 09/436,956--.

Signed and Sealed this

Eighth Day of August, 2006

JON W. DUDAS
*Director of the United States Patent and Trademark Office*